United States Patent
Joshi et al.

(10) Patent No.: US 10,292,070 B2
(45) Date of Patent: May 14, 2019

(54) MANAGING NETWORK TRAFFIC

(71) Applicant: Hewlett Packard Enterprise Development LP, Houston, TX (US)

(72) Inventors: Venkatesh Joshi, Bangalore Karnataka (IN); Brijesh Kumar Yadav, Bangalore Karnataka (IN); Navaneetha Krishna Gowda Thippesh, Bangalore Karnataka (IN); Gopal Agarwal, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/294,817

(22) Filed: Oct. 17, 2016

(65) Prior Publication Data
US 2017/0245177 A1 Aug. 24, 2017

(30) Foreign Application Priority Data
Feb. 19, 2016 (IN) .............................. 201641005929

(51) Int. Cl.
*H04L 12/863* (2013.01)
*H04W 28/02* (2009.01)
*H04L 29/06* (2006.01)

(52) U.S. Cl.
CPC ..... *H04W 28/0284* (2013.01); *H04L 47/6215* (2013.01); *H04L 65/80* (2013.01)

(58) Field of Classification Search
CPC .. H04L 41/5022; H04L 49/205; H04W 28/14; H04W 52/367; H04W 52/143; H04W 52/346
See application file for complete search history.

(56) References Cited

U.S. PATENT DOCUMENTS 6,633,540 B1 * 10/2003 Raisanen ............... H04L 47/10
370/230.1
2008/0186846 A1 * 8/2008 Stephenson ........... H04L 47/801
370/230
(Continued)

OTHER PUBLICATIONS

Juniper Networks, "Dynamic Call Admission Control Overview," (Web Page), Oct. 5, 2012. available at http://www.juniper.net/techpubs/en_US/junos12.1/topics/concept/secur ity-call-admission-control-dynamic-overview.html.
(Continued)

*Primary Examiner* — Redentor Pasia
*Assistant Examiner* — Peter K Mak
(74) *Attorney, Agent, or Firm* — Hewlett Packard Enterprise Patent Department

(57) ABSTRACT

Examples relate to managing network traffic. In one example, a computing device may: receive voice network traffic from each of a plurality of voice clients; enqueue the received voice network traffic into a voice Wi-Fi Multimedia (WMM) queue; determine a measure of WMM queue utilization based on data queued in the voice WMM queue; determine a measure of radio congestion for a surrounding area; and determine, based on the measure of WMM queue utilization and the measure of radio congestion, to: stop prioritization of newly received voice traffic from new voice clients, or transition at least one of the plurality of voice clients to a neighboring computing device.

15 Claims, 4 Drawing Sheets

(56) References Cited

U.S. PATENT DOCUMENTS

| | | | |
|---|---|---|---|
| 2009/0323524 A1* | 12/2009 | Kuhn | H04L 41/5022 |
| | | | 370/230 |
| 2011/0110259 A1* | 5/2011 | Lennartson | H04W 52/346 |
| | | | 370/252 |
| 2012/0147753 A1 | 6/2012 | Jayawardena et al. | |
| 2012/0224481 A1 | 9/2012 | Babiarz et al. | |
| 2012/0224483 A1 | 9/2012 | Babiarz et al. | |
| 2012/0224484 A1 | 9/2012 | Babiarz et al. | |
| 2013/0031287 A1* | 1/2013 | Miyake | G01C 21/3629 |
| | | | 710/265 |
| 2014/0307550 A1 | 10/2014 | Forssell et al. | |
| 2014/0362850 A1* | 12/2014 | Wakely | H04M 7/0066 |
| | | | 370/352 |

OTHER PUBLICATIONS

CISCO, "Configuring QoS," (Web Page), retrieved online on Jul. 15, 2015, available online at CISCO, "Configuring QoS," (Web Page), retrieved online on Jul. 15, 2015, available online at http://www.cisco.com/c/en/us/td/docs/wireless/access_point/15_2_4_JA/configuration/guide/scg15-2-4_book/scg15-2-4-JA- chap15-qos.html.

\* cited by examiner

MANAGING NETWORK TRAFFIC

BACKGROUND

Computer networks often include a variety of different types of devices for processing network traffic. Servers, routers, switches, and load-balancers, for example, are devices that may operate within a computer network to forward traffic from one computing device to another. In some situations, network devices may be used to manage the flow of network traffic, e.g., prioritizing network traffic based on how network packets are classified. For example, voice network traffic may be given a relatively high priority so that clients using voice communications are less likely to experience a delay in transmission. Standard web traffic, on the other hand, may be given a relatively low priority, as a slight delay in web page loading time, for example, may be less disruptive to a user's experience than delayed voice communications.

BRIEF DESCRIPTION OF THE DRAWINGS

The following detailed description references the drawings, wherein.

DETAILED DESCRIPTION

Figure 1:
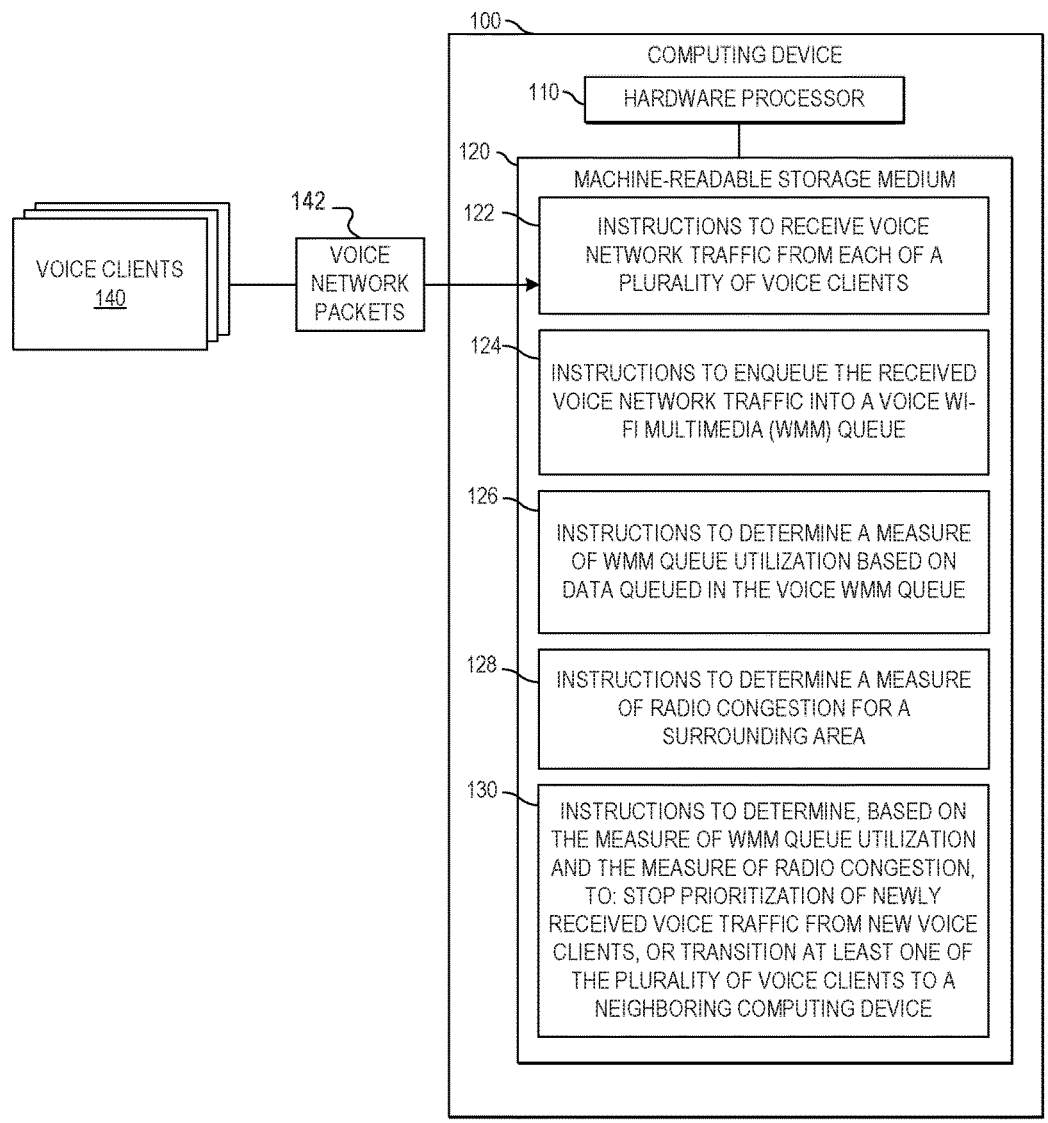
FIG. 1 is a block diagram of an example computing device for managing network traffic.

Network access points, whether wired or wireless, physical or virtual, software defined or traditional, may be used to manage network traffic in a manner designed to ensure the quality of high priority traffic being handled by the access points. For example, access points may use a combination of a classification system and Wi-Fi Multimedia (WMM) queues to classify and queue network traffic, e.g., voice traffic, video traffic, best-effort traffic, and background traffic sent by or to a client device. Each type of traffic may have its own priority and its own queue, and the access point may transmit the traffic based on the associated priorities, e.g., voice traffic at highest priority, video traffic second highest, best-effort traffic third, and background traffic last.

Various factors can affect the quality of network traffic traversing an access point. One factor is bandwidth capacity, e.g., the amount of data an access point can handle at any given time. Another factor is WMM queue capacity, or utilization, e.g., network packets that are placed in an access point's WMM queue may be delayed before being transmitted to their intended destination, and a more heavily utilized queue may cause an increase in the delay. In situations where wireless communications are used, wireless radio congestion may be a factor that affects the quality of network traffic, e.g., heavily saturated radio channels used for wireless communications can cause delays in wireless communications. Access points may monitor wireless radio congestion, if applicable, and WMM queue utilization and, in situations where queue utilization and/or radio congestion meet or exceed a threshold, take action designed to ensure the quality of high priority traffic currently being handled by the access point. For example, an access point may determine that the level of voice network traffic in a voice WMM queue exceeds a predetermined threshold. To avoid delays in transmitting the voice traffic, the access point may refuse new communications for new clients and/or transfer existing communications to a nearby access point.

By way of example, a wireless access point may have connections with several client computing devices, three of which are voice clients sending and receiving voice communications through the wireless access point, four of which are video clients receiving video content through the wireless access point, and two of which are best-effort clients sending and receiving web browsing traffic. The access point may queue traffic, e.g., in situations where traffic exceeds available bandwidth, in WMM queues. For example, voice communications packets may be queued in a voice WMM queue, video packets may be queued in a video WMM queue, and web browsing packets may be queued in a best-effort WMM queue. While network traffic enters and leaves the WMM queues, the access point may monitor queue utilization. If the voice WMM queue is over-utilized, e.g., because an average delay for packets that entered the voice WMM queue exceeds a threshold measure of delay, the access point may take actions designed to ensure high quality treatment for the existing voice communications. Over-utilization of the voice WMM queue may lead to degradation of the voice communications for one or all three of the voice clients connected to the access point. In some implementations, the access point may communicate with neighboring access points to determine whether one of the nearby access points can handle one of the three existing voice clients and, if a neighboring access point is ready to accept a new voice client, facilitate the transfer of one of the voice clients to the neighboring access point. Other actions, such as rejecting new clients or transferring other types of clients, may also be performed by the access point. The manner in which computing devices, such as wireless access points, manage network communications is described in further detail in the paragraphs that follow.

Referring now to the drawings, FIG. 1 is a block diagram of an example computing device 100 for managing network traffic. Computing device 100 may be, for example, a network switch, network router, a wireless access point, a server computer, a personal computer, or any other electronic device, physical or virtual, suitable for managing network traffic. In the implementation of FIG. 1, computing device 100 includes hardware processor 110 and machine-readable storage medium 120. In some implementations, the computing device 100 may be implemented in a programmable hardware device, e.g., using an Application Specific Integrated Circuit (ASIC) or Field-Programmable Gate Array (FPGA).

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-130, to control the process for managing network traffic. As an alternative or in addition to retrieving and executing instructions, hardware processor 110 may include one or more electronic circuits, such as an ASIC and/or FPGA, that include electronic components for performing the functionality of one or more of the instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-130, for managing network traffic.

The example implementation in FIG. 1 also depicts voice clients 140 providing voice network packets 142 to the computing device 100. Voice clients are separate computing devices that are using the computing device 100 to transmit voice communications, e.g., voice-over-IP (VoIP) calls. Voice clients may include, for example, personal computers, mobile devices, server computers, and/or VoIP phones. The computing device 100 may be in communication with and receiving data from many other types of client devices, such as video client devices sending and/or receiving video network packets, best-effort clients sending and/or receiving best-effort network packets, or background clients sending and/or receiving background network packets.

As used herein, a client computing device may be described as a voice, video, best-effort, or background client based on the highest priority network communications the client device is sending and/or receiving. Client devices may be sending and/or receiving more than one type of traffic, but may generally be classified based on the highest priority traffic currently being sent or received. For example, a personal computing device may have an active VoIP call while also being actively engaged in browsing the web. Network packets received by the computing device 100 may be separately classified, e.g., as voice for VoIP packets and best-effort for web browsing network packets, the client device itself may simply be labeled a voice client. The methods described herein for managing network traffic may be used with many different classification systems and types of client devices. In some implementations, for example, clients need not be labeled as a particular type of client, network traffic priorities may differ, the number and capacity of WMM queues used may differ, and more or less or different classifications may be used for classifying network packets.

As shown in FIG. 1, the computing device 100 executes instructions 122 to receive voice network traffic from each of a plurality of voice clients 140. For example, the computing device 100 may be a wireless access point (AP) that is transmitting and receiving voice network packets 142 for active VoIP calls from several personal computers. As noted above, the computing device 100 may also be sending/receiving other types of network traffic from the existing voice clients 140 and/or other client devices. In some implementations, the computing device 100 may execute instructions for receiving voice network traffic from a single voice client, e.g., multiple voice clients 140 are not required. In some implementations, some types of non-voice traffic may be classified as voice network traffic, e.g., to provide the same level of priority to those types of non-voice traffic.

The computing device 100 executes instructions 124 to enqueue the received voice network traffic into a voice WMM queue. The computing device 100 may make use of the voice WMM queue in a manner designed to ensure transmission of network packets in a timely manner and in accordance with their respective priorities. In this example situation, voice network packets are given the highest priority, video network packets are given the second highest priority, best-effort network packets are given the third highest priority, and background packets are given the lowest priority. As noted above, more or less network packet classifications may be used, and the priority of packets may differ. During operation, the computing device 100 may frequently add and remove network packets from various WMM queues.

The computing device 100 executes instructions 126 to determine a measure of WMM queue utilization based on data queued in the voice WMM queue. The determination may be made in a variety of ways. The measure of WMM queue utilization may be for the voice WMM queue only, or may include one or more of the other WMM queues. In some implementations, utilization is measured in average packet delay, e.g., in milliseconds. For example, the computing device 100 may determine WMM queue utilization by measuring the average delay in transmission of packets that entered the voice WMM queue. Other measures of utilization, such as the amount of queued data, e.g., in bytes, kilobytes, or megabytes, or the number of queued network packets, e.g., 10, 100, or 1,000 network packets, in one or more of the WMM queues, may be used to determine utilization. For example, the computing device 100 many determine WMM queue utilization by determining the total amount of data queued in all of the WMM queues.

The computing device 100 executes instructions 128 to determine a measure of radio congestion for a surrounding area. In implementations where the computing device 100 includes wireless communications capabilities, e.g., in the case of a wireless AP, measuring radio congestion may facilitate determining whether voice client network traffic may be negatively affected by wireless conditions. Higher radio congestion may cause a decrease in the quality of wireless transmissions. In some implementations radio congestion may be measured by a separate component of the computing device 100. Radio congestion can be measured in a variety of ways, such as measuring channel busy-time and/or counting the number of devices operating on a given wireless channel.

The computing device 100 executes instructions 130 to determine, based on the measure of WMM queue utilization and the measure of radio congestion, to: stop prioritization of newly received voice traffic from new voice clients, or transition at least one of the voice clients 140 to a neighboring computing device. In some implementations, the computing device 100 may use one or more thresholds to determine whether to take action based on the measure of WMM queue utilization. Thresholds may be predetermined for each WMM queue, for the combined WMM queues, and/or for radio congestion. For example, each WMM queue may have its own threshold based on average packet delay. In a situation where packets in the voice WMM queue have an average packet delay that meets or exceeds a threshold, the computing device 100 may take one of the above actions. In some implementations, thresholds for the other WMM queues, e.g., the video, best-effort, and background WMM queues, may be handled in a manner similar to the voice WMM queue.

The manner in which the computing device 100 takes action in response to WMM queue utilization and/or radio congestion being above a threshold varies. In some implementations, the computing device 100 may transition one of the voice clients 140 to a neighboring computing device, e.g., using 802.11r or 802.11v transitions. In some implementations, the computing device 100 may transition non-voice clients to a neighboring computing device, e.g., clients sending/receiving high bandwidth but low priority communications. In some implementations, the computing device 100 may refuse new voice clients, e.g., so as not to further over-utilize the resources of the computing device 100. Other actions or combinations of actions may also be performed by the computing device 100, instead of or in addition to the actions described above.

The example functionality described above with respect to FIG. 1 provides one of a variety of example computing devices and methods for managing network traffic. Further implementations and examples are described in further detail in the paragraphs that follow.

Figure 2A:
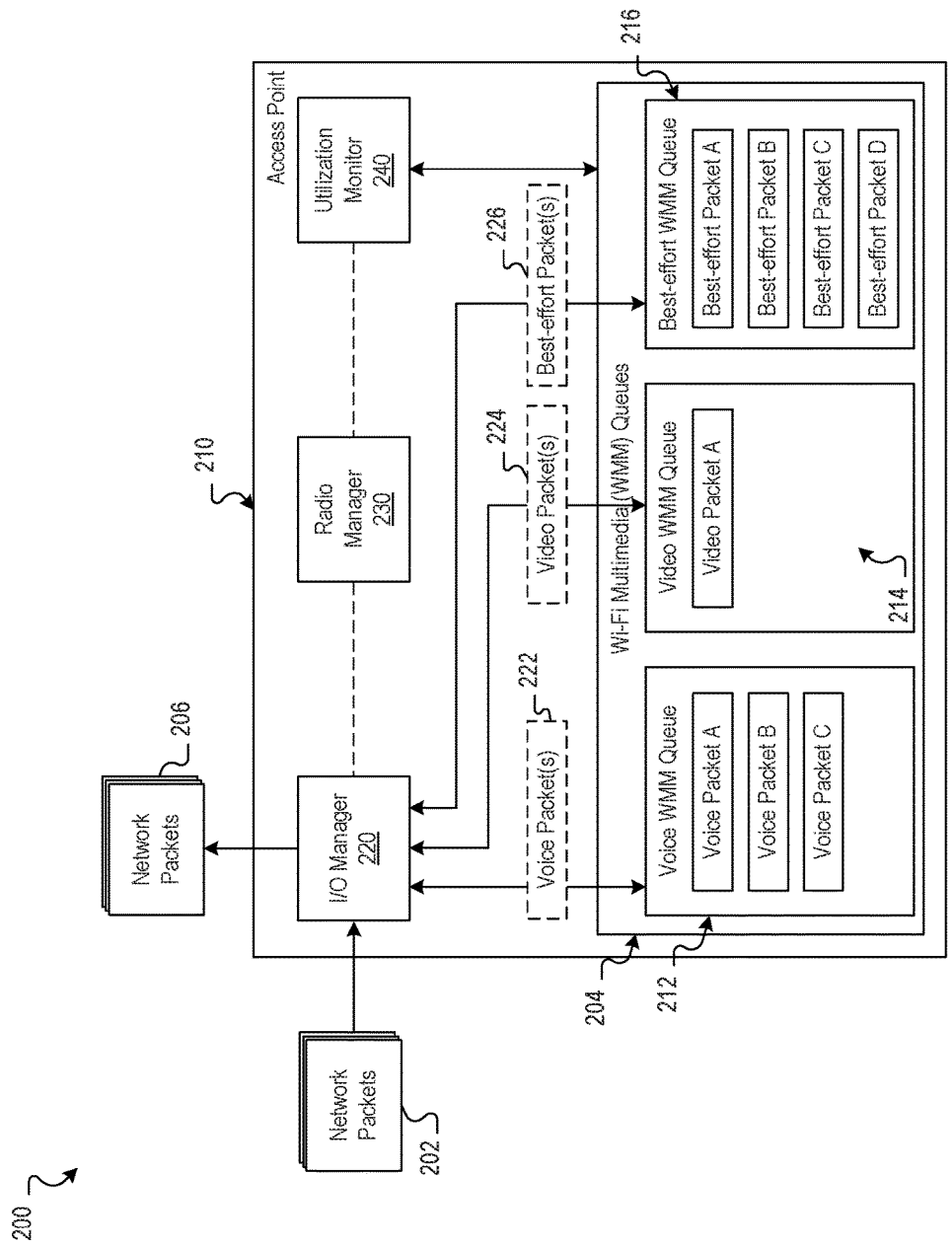
FIG. 2A is an example data flow for managing network traffic within a computing device.

FIG. 2A is an example data flow 200 for managing network traffic within a computing device, e.g., access point (AP) 210. The access point may include programmable hardware, such as an ASIC or FPGA, configured to perform operations designed to manage network traffic as it flows through the access point 210. In some implementations, programmable hardware included in the access point 210 may be configured to perform the operations described above with respect to the hardware processor of FIG. 1.

The example access point 210 includes example components, e.g., I/O manager 220, a radio manager 230, and a utilization monitor 240. The I/O manager 220 may, for example, receive incoming and send outgoing network traffic and be responsible for enqueueing and dequeueing network packets into respective WMM queues. The radio manager 230 may, for example, be responsible for managing wireless channels of operation for the access point, broadcasting wireless beacon signals, and measuring radio congestion. The utilization monitor 240 may, for example, track WMM queue utilization and determine, based on the utilization and radio congestion, what actions to take—if any— to ensure the quality of certain types of network traffic. The foregoing components are one example implementation, an access point or other computing device may include other components, and the functionality of various components may differ. In addition, the described components could be combined into a single component, e.g., a processor, integrated circuit, or controller for performing some or all of the component functionality described above.

The example access point 210 also includes WMM queues 204, each of which may be implemented using any combination of circuitry, buffers, and/or computer readable mediums. The example WMM queues 204 include three separate queues, a voice WMM queue 212 for voice network packets 222, a video WMM queue for video network packets 224, and a best-effort WMM queue 216 for best-effort network packets 226. As noted above, in some implementations other or different queues may be used, e.g., a background WMM queue may be used for background traffic that has a lowest priority.

During operation, the access point 210 receives network packets 202 from a variety of client devices. The I/O manager 220 may forward the received packets to their intended destination and/or, in situations where network packets are being received faster than they can be processed and sent, queue some or all of the received network packets into one of the WMM queues 204. The I/O manager 220 may identify the class associated with each of the incoming network packets 202 or class associated with a stream of network packets, and queue the network packets according to their identified class. Network packet classes may be identified in a variety of ways, e.g., by port number, protocol, or other similar identifier. Network packets that are classified as voice network packets 222, which may include non-voice network packets with a similar priority to voice network packets, are queued in the voice WMM queue 212. Network packets that are classified as video network packets 224, which may include non-video network packets with a similar priority to video network packets, are queued in the video WMM queue 214. Network packets that are classified as best-effort network packets 226 are queued in the best-effort WMM queue 216.

In the example data flow 200, the I/O manager 220 retrieves network packets from the WMM queues 204 in a manner designed to achieve a certain quality of service (QoS) or priority associated with transmittal of the network packets. For example, the access point 210 may be configured in a manner designed to ensure that voice network packets 222 are delayed by no more than 100 ms, video network packets 224 are delayed by no more than 200 ms, and best-effort network packets are delayed by no more than 300 ms. Packets may be retrieved from each individual queue, e.g., in a first in first out manner, prior to be transmitted by the I/O manager 220. In accordance with the above priorities the I/O manager 220 may send packets when available bandwidth and/or radio congestion permits.

In the example data flow 200, the utilization monitor 240 tracks WMM queue utilization. Queue utilization may be tracked in a variety of ways. In some implementations, packet delay or average network packet delay, e.g., relative or absolute, may be used to determine how heavily utilized a particular WMM queue is. For example, voice WMM queue 212 utilization may be measure by average packet delay relative to the QoS target, e.g., 100 ms. In this situation, an average voice WMM queue 212 packet delay of 50 ms would indicate 50% utilization of the voice WMM queue 212, a delay of 100 ms would indicate 100% utilization, and a delay of 150 ms would indicate 150% utilization. As another example, video WMM queue 214 utilization may be measured relative to a QoS target of 200 ms, e.g., an average voice packet delay of 50 ms would indicate 25% utilization, a delay of 100 ms would indicate 50% utilization, and a delay of 150 ms would indicate 75% utilization.

In some implementations, queue utilization may be tracked using a number of queued packets at a given time, or an average number of queued packets over a given period of time. For example, a queue may be considered 100% utilized when 1,000 packets are in the queue, or when the average number of packets in queue over the past five seconds is 1,000. In some implementations, queue utilization may be tracked using an amount of data, e.g., in kilobytes or megabytes or gigabytes, in a queue at a given time, or an average amount of data queued over a given period of time. For example, a queue may be considered 100% utilized when 10 megabytes are in the queue, or when the average amount of data in queue over the past 10 seconds is 10 megabytes.

In some implementations, utilization may be separately tracked for each individual WMM queue and/or for the WMM queues 204 as a whole, e.g., by aggregate or average utilization. Different queues may use different methods of tracking utilization, and the utilization capacities may also differ from queue to queue.

In the example data flow 200, the utilization monitor 240 determines whether one or more of the measures of queue utilization meet a utilization threshold. Each queue may have its own separate utilization threshold, and in some implementations an aggregate threshold for all of the WMM queues 204 may be used. An example utilization threshold may be 100% utilization, e.g., a WMM queue that is 100% utilized may met the threshold. In some implementations, utilization thresholds are not 100% utilization, e.g., a threshold may be set at 50%, 200%, or 300% utilization. While the example thresholds above are given in utilization percentage, in some implementations the thresholds may be expressed using other values, e.g., delay time, number of packets, or amount of data.

The thresholds may be used, e.g., by the utilization monitor 240, to determine when action should be taken to actively manage network traffic flowing through the access point 210. Generally, action may be taken in a manner designed to ensure that the quality of high priority traffic, such as voice traffic, is not degraded due to over-utilization of the access point 210.

In some implementations, radio congestion is also measured, e.g., because radio congestion may also affect delays in transmission of network traffic by the access point 210. A radio congestion threshold may be used, alone or in combination with WMM queue thresholds, to determine when action should be taken to actively manage network traffic flowing through the access point.

When the utilization monitor 240 determines that action should be taken to manage network traffic flowing through the access point 210, e.g., based on one or more WMM queue utilization thresholds and/or a radio congestion threshold, a variety of actions may be taken. As noted above, the actions taken are generally designed to ensure the quality of high priority traffic. In the example data flow 200, voice traffic is afforded the highest priority. The specific actions taken may depend on a number of things, such as which traffic is higher priority and which threshold(s) has/have been met.

In some implementations, in response to determining that one or more of the utilization thresholds and/or congestion threshold has been met, the utilization monitor 240 causes the access point 210 to stop prioritizing at least some new network traffic from new clients and/or use a lower prioritization for new network traffic. Ending prioritization of new client network traffic may help reduce current queue utilization by preventing new high priority traffic from being sent to or prioritized by the access point. To end prioritization, the access point 210 may, for example, refuse new connections from new clients, refuse new network traffic of a particular type from an existing client, and/or use a lower priority classification for new network traffic from new and/or existing clients. By way of example, if a client computing device is connected to the access point 210 and sending best-effort traffic only, when prioritization of new traffic is stopped, any voice and/or video traffic received from the client computing device may be stopped and/or downgraded, e.g., to best-effort or background traffic. Client devices that experience blocked or downgraded traffic may, in some implementations, be notified of such action, e.g., along with a recommendation or instructions to try another access point or—e.g., in situations where radio congestion is high—seek a wired connection to the access point 210.

In some implementations, in response to determining that one or more of the utilization thresholds and/or congestion threshold has been met, the utilization monitor 240 causes the access point 210 to transition network traffic being sent from at least one existing client to a neighboring computing device. Transitioning high bandwidth traffic and/or high priority traffic may, for example, reduce queue utilization and/or ensure that high priority traffic is transferred to a different device that may be capable of providing high quality service. By way of example, a current voice client that supports 802.11r or 802.11v transitions may be instructed to transition to a neighboring access point. Neighboring computing devices, as used herein, include nearby access points, e.g., those that are within wireless range of the access point 210 and/or the client device being transitioned. In a situation where connections are wired, a neighboring computing device may be, for example, a computing device within the same local network and through which the client may be routed without having to go through the access point 210. In some implementations, other types of traffic, and/or more than one type of traffic, may be transitioned to a neighboring computing device. For example, in a situation where best-effort traffic is using a large portion of bandwidth or access point throughput, one or more of the best-effort clients may be transitioned, e.g., to free up bandwidth or throughput for higher priority traffic.

In some implementations, the access point 210 may end the actions taken or being taken in response to decreased queue utilization and/or decreased radio congestion. For example, when queue utilization drops below a threshold, which may be the same threshold that triggered throttling or a different threshold, new network traffic from new and/or existing clients may be prioritized normally, e.g., as it was prior to throttling. As another example, when radio congestion drops below a threshold level, new network traffic may be prioritized normally.

While the example data flow 200 depicts several components performing the functions described above within an access point, other implementations may also manage network traffic in a similar manner. For example, the functions may be performed by a programmable software-defined access point or network switch, a virtual access point or switch, or other computing devices, such as load balancing devices and server computers.

Figure 2B:
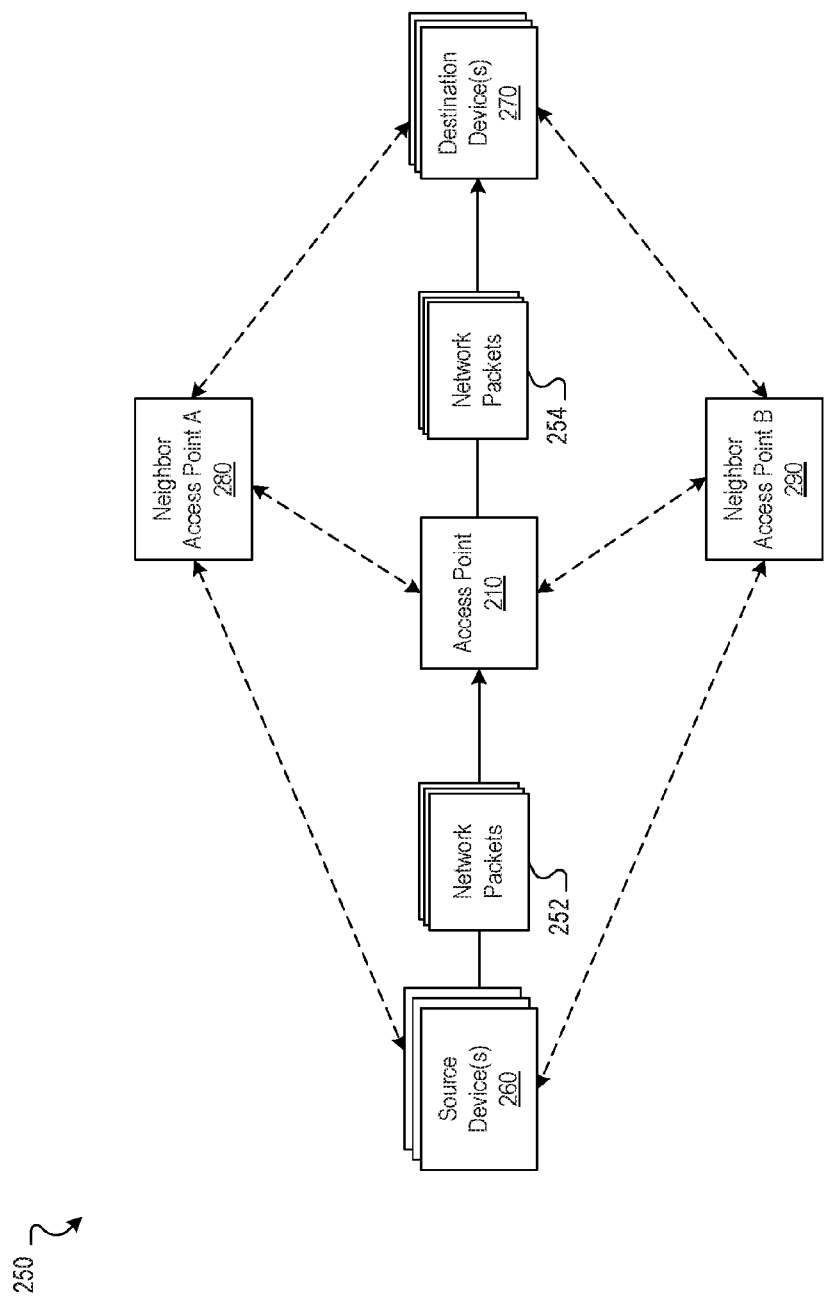
FIG. 2B is an example data flow for managing network traffic.

FIG. 2B is an example data flow 250 for managing network traffic. The example data flow 250 depicts the example access point 210 of FIG. 2A in a network environment that includes two neighboring access points, neighbor access point A 280 and neighbor access point B 290. The data flow 250 depicts the transmission of network packets 252 from various source devices 260 to various destination devices 270 through the access point 210. The dotted lines between devices indicate potential communication between the corresponding devices, e.g., in the example data flow, each of the source devices 260 and the access point 210 are capable of communicating with neighbor access point A 280 or B 290.

In a situation where the access point 210 determines to transition network traffic from one of the source devices 260 to a neighboring access point, e.g., as described above with respect to FIG. 2A, transitions may occur in a variety of ways. One or more of the example source devices 260 may be instructed to transition to one of the example neighboring access points, e.g., using 11v or 11r transitions. The neighboring device selected for transitioning to may be determined by the access point 210 and/or the source device 260 to be transitioned. For example, the access point 210 may, in some implementations, communicate with neighboring access points to determine which would have the most available bandwidth or lowest WMM queue utilization. As another example, the source device 260 to be transitioned may communicate with neighboring access points within range and choose one to transition to based on signal strength, available bandwidth, and/or WMM queue utilization. The example data flows 200 and 250 depicted in FIGS. 2A and 2B are example configurations of a device for managing the flow of network traffic. Other types of devices, with different components and configurations, may be used in the same or different environments to manage the flow of network traffic using WMM queue utilization.

Figure 3:
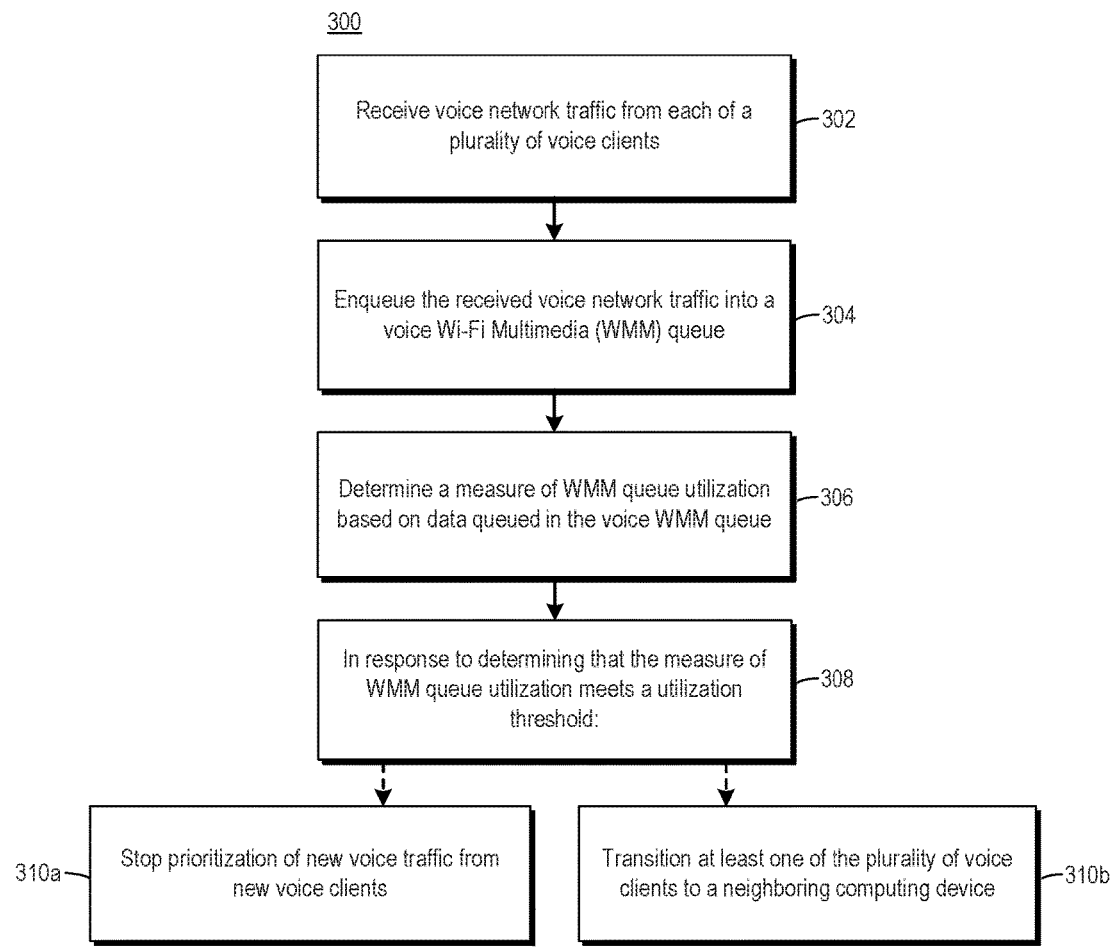
FIG. 3 is a flowchart of an example method for managing network traffic.

FIG. 3 is a flowchart of an example method 300 for managing network traffic. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry, such as an ASIC.

Voice network traffic is received from a plurality of voice clients (302). Voice network traffic may be, for example, any network traffic that is classified for a relatively high priority, e.g., VoIP traffic or video game traffic.

The received voice network traffic is enqueued into a voice WMM queue (304). Generally, all received network traffic may be queued for later transmission. How quickly traffic is transmitted may depend on a variety of things, such as the current load on the device receiving the traffic, throughput of the device, and/or wireless congestion in situations using wireless communications.

A measure of WMM queue utilization is determined based on data queued in the voice WMM queue (306). In some implementations, WMM queue utilization is determined based on data queued in all of the WMM queues, including the voice WMM queue. Queue utilization may be measured using, for example, average packet transmission delay, storage space taken by queued network packets, and/or number of queued network packets.

In some implementations, wireless radio congestion is also measured. For example, signal strength and/or channel use may be measured to determine congestion for one or more wireless channels.

In response to determining that the measure of WMM queue utilization meets a utilization threshold (308), i) prioritization of new voice traffic from new voice clients is stopped (310a), or ii) at least one of the plurality of voice clients is transitioned to a neighboring computing device (310b). Either or both of the foregoing actions make be taken. In some implementations, wireless radio congestion and congestion thresholds may also be used to stop prioritization of new voice traffic and/or transition current voice clients. As noted above, the actions to be taken are designed to ensure that high priority network traffic, such as voice traffic, is not degraded due to over-utilization of network computing devices and/or wireless congestion.

The foregoing disclosure describes a number of example implementations for managing network traffic. As detailed above, examples provide a mechanism for measuring WMM queue utilization, and potential applications of a system that is capable of managing network traffic using WMM queue utilization.

We claim:

1. A computing device for managing network traffic, the computing device comprising:
   a plurality of Wi-Fi Multimedia (WMM) queues including:
      a voice queue for voice network traffic;
      a video queue for video network traffic; and
      a best-effort queue for best-effort network traffic; and
   a programmable hardware processor to:
      receive at least one of:
         voice network traffic from at least one voice client; or
         video network traffic from at least one video client;
      determine, by the programmable hardware processor, that at least one measure of queue utilization for at least one of the WMM queues meets a utilization threshold; and
      determine, by the programmable hardware processor and based on the at least one measure of queue utilization, that the programmable hardware processor is to:
         afford the voice network traffic in the voice queue a higher priority than a new voice network traffic, a video network traffic, and a best-effort network traffic,
         stop prioritizing at least one of the new voice network traffic or the new video network traffic from corresponding new voice clients or new video clients, and
         transition at least one of the new voice network traffic, the video network traffic, and the best-effort network traffic from one of the at least one voice client or the at least one video client to a neighboring computing device, when the measure of queue utilization exceeds a pre-determined threshold.

2. The computing device of claim 1, wherein the programmable hardware processor is to:
   determine a measure of voice network traffic queued in the voice queue;
   determine a measure of video network traffic queued in the video queue; and
   determine a measure of best-effort network traffic queued in the best-effort queue.

3. The computing device of claim 2, wherein the programmable hardware processor determines that at least one measure of queue utilization for at least one of the WMM queues meets a utilization threshold by at least one of:
   determining that the measure of voice network traffic queued in the voice queue meets a voice utilization threshold;
   determining that the measure of video network traffic queued in the video queue meets a video utilization threshold; and
   determining that the measure of best-effort network traffic queued in the best-effort queue meets a best-effort utilization threshold.

4. The computing device of claim 3, wherein the programmable hardware processor is to:
   receive, best-effort network traffic from at least one best-effort client, and
   in response to determining that the measure of best-effort network traffic queued in the best-effort queue meets a best-effort utilization threshold, transition network traffic from one of the at least one best-effort client to a neighboring computing device.

5. The computing device of claim 1, wherein the programmable hardware processor is to:
   receive, from a particular client, a request for i) voice network traffic, or ii) video network traffic; and
   in response to the request, refuse the request.

6. A method for managing network traffic, implemented by a hardware processor, the method comprising:
   receiving, by the hardware processor, voice network traffic from each of a plurality of voice clients;
   enqueueing, by the hardware processor, the voice network traffic into a voice Wi-Fi Multimedia queue;
   determining, by the hardware processor, a measure of WMM queue utilization based on data queued in the voice WMM queue; and
   in response to determining, by the hardware processor, that the measure of WMM queue utilization meets a utilization threshold:

afford the voice network traffic in the voice WMM queue a higher priority than a new voice network traffic, a video network traffic, and a best-effort network traffic, stopping prioritization of new voice traffic from new voice clients, and transitioning at least one of the new voice network traffic, the video network traffic and the best-effort network traffic to a neighboring computing device.

7. The method of claim 6, further comprising:

receiving, by the hardware processor, best-effort network traffic from at least one best-effort client, and in response to determining that a measure of best-effort network traffic queued in a best-effort WMM queue meets a best-effort utilization threshold, transition network traffic from one of the at least one best-effort client to a neighboring computing device.

8. The method of claim 6, further comprising:

receiving, by the hardware processor, video network traffic from at least one video client, and in response to determining that a measure of video network traffic queued in a video WMM queue meets a video utilization threshold, transition network traffic from one of the at least one video client to a neighboring computing device.

9. The method of claim 6, further comprising:

determining, by the hardware processor, a measure of radio congestion for a surrounding area; and in response to determining that the measure of radio congestion for the surrounding area meets a threshold measure of congestion:

stopping prioritization of new voice traffic from new voice clients, or transitioning at least one of the plurality of voice clients to a neighboring computing device.

10. The method of claim 6, further comprising:

receiving, from a particular client, a request for i) voice network traffic, or ii) video network traffic; and based on the determination that the measure of WMM queue utilization meets the utilization threshold, refuse the request.

11. A non-transitory machine-readable storage medium encoded with instructions executable by a hardware processor of a computing device for managing network traffic, the non-transitory machine-readable storage medium comprising instructions to cause the hardware processor to:

receive voice network traffic from each of a plurality of voice clients enqueue the voice network traffic into a voice Wi-Fi Multimedia (WMM) queue;

determine a measure of WMM queue utilization based on data queued in the voice WMM queue;

determine a measure of radio congestion for a surrounding area; and determine, based on the measure of WMM queue utilization and the measure of radio congestion, to:

afford the voice network traffic in the voice WMM queue a higher priority than a new voice network traffic, a video network traffic, and a best-effort network traffic, stop prioritization of newly received voice traffic from new voice clients; and transition at least one of the new voice network traffic, the video network traffic and the best-effort network traffic to a neighboring computing device, when the measure of queue utilization exceeds a pre-determined threshold.

12. The non-transitory machine-readable storage medium of claim 11, wherein the instructions further cause the hardware processor to:

receive best-effort network traffic from at least one best-effort client; and enqueue the best-effort network traffic into a best-effort WMM queue, and wherein the measure of WMM queue utilization is further based on a measure of data queued in the best-effort WMM queue.

13. The non-transitory machine-readable storage medium of claim 12, wherein the instructions further cause the hardware processor to:

determine, based on the measure of WMM queue utilization, to transition network traffic from one of the at least one best-effort client to a neighboring computing device.

14. The non-transitory machine-readable storage medium of claim 11, wherein the instructions further cause the hardware processor to:

receive video network traffic from at least one video client; and enqueue the video network traffic into a video WMM queue, and wherein the measure of WMM queue utilization is further based on a measure of data queued in the video WMM queue.

15. The non-transitory machine-readable storage medium of claim 14, wherein the instructions further cause the hardware processor to: determine, based on the measure of WMM queue utilization, to transition network traffic from one of the at least one video client to a neighboring computing device.

* * * * *